US012044775B2

(12) United States Patent
Fan

(10) Patent No.: US 12,044,775 B2
(45) Date of Patent: Jul. 23, 2024

(54) METHODS AND SYSTEMS FOR DETECTING AND MITIGATING AUTOMOTIVE RADAR INTERFERENCE

(71) Applicant: Waymo LLC, Mountain View, CA (US)

(72) Inventor: Ryan Fan, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 460 days.

(21) Appl. No.: 17/357,424

(22) Filed: Jun. 24, 2021

(65) Prior Publication Data

US 2022/0413129 A1 Dec. 29, 2022

(51) Int. Cl.
*G01S 13/931* (2020.01)
*G01S 7/02* (2006.01)
*G01S 13/89* (2006.01)

(52) U.S. Cl.
CPC ............ *G01S 13/931* (2013.01); *G01S 7/024* (2013.01); *G01S 13/89* (2013.01)

(58) Field of Classification Search
CPC ................................ G01S 13/931; G01S 7/024
See application file for complete search history.

(56) References Cited

U.S. PATENT DOCUMENTS

| 8,471,760 | B2 | 6/2013 | Szajnowski |
| 9,767,330 | B2 | 9/2017 | Roberts |
| 10,215,853 | B2 | 2/2019 | Stark et al. |

(Continued)

FOREIGN PATENT DOCUMENTS

| CN | 106405657 A | 2/2017 |
| CN | 107110969 A | 8/2017 |

(Continued)

OTHER PUBLICATIONS

Rameez, "Interference Mitigation Techniques In FMCW Automotive Radars", Department of Mathematics and Natural Sciences, Blekinge Institute of Technology Licentiate Dissertation Series, No. 2020:03; pp. 1-86, May 2020.

(Continued)

*Primary Examiner* — Bernarr E Gregory
*Assistant Examiner* — Hailey R Le
(74) *Attorney, Agent, or Firm* — McDonnell Boehnen Hulbert & Berghoff LLP

(57) ABSTRACT

Example embodiments relate to techniques that involve detecting and mitigating automotive interference. Electromagnetic signals propagating in the environment can be received by a radar unit that limits the signals received to a particular angle of arrival with reception antennas that limit the signals received to a particular polarization. Filters can be applied to the signals to remove portions that are outside an expected time range and an expected frequency range that depend on radar signal transmission parameters used by the radar unit. In addition, a model representing an expected electromagnetic signal digital representation can be used to remove portions of the signals that are indicative of spikes and plateaus associated with signal interference. A computing device can then generate an environment representation that indicates positions of surfaces relative to the vehicle using the remaining portions of the signals.

20 Claims, 10 Drawing Sheets

(56) References Cited

U.S. PATENT DOCUMENTS

| | | | |
|---|---|---|---|
| 10,482,768 B1 | 11/2019 | Sato et al. | |
| 11,623,494 B1* | 4/2023 | Arnicar | G01S 17/931 |
| | | | 701/37 |
| 11,761,780 B1* | 9/2023 | Duenas Arana | G01C 21/30 |
| | | | 701/533 |
| 2014/0278214 A1* | 9/2014 | Broad | G01S 5/12 |
| | | | 342/146 |
| 2017/0353777 A1* | 12/2017 | Mach | G08B 21/12 |
| 2019/0199382 A1 | 6/2019 | Varughese et al. | |
| 2019/0302224 A1 | 10/2019 | Bordes et al. | |
| 2019/0339384 A1* | 11/2019 | Peng | G08G 5/0069 |
| 2020/0082014 A1* | 3/2020 | Unverdorben | G01S 13/726 |
| 2020/0153907 A1 | 5/2020 | Davis et al. | |
| 2020/0296730 A1 | 9/2020 | Kwasnick et al. | |
| 2020/0326407 A1 | 10/2020 | McCloskey et al. | |
| 2021/0124011 A1* | 4/2021 | Madhow | G01S 13/86 |
| 2021/0239822 A1* | 8/2021 | Vollbracht | G01S 7/352 |
| 2022/0045554 A1* | 2/2022 | Leabman | A61B 8/56 |
| 2022/0284671 A1* | 9/2022 | Baker | G01C 15/002 |
| 2022/0393341 A1* | 12/2022 | Shams | H01Q 21/06 |

FOREIGN PATENT DOCUMENTS

| | | |
|---|---|---|
| CN | 109960277 A | 7/2019 |
| CN | 107231159 B | 6/2020 |
| CN | 107241146 B | 6/2020 |
| CN | 107515621 B | 9/2020 |
| CN | 107943084 B | 9/2020 |
| DE | 102019202836 A1 | 9/2020 |

OTHER PUBLICATIONS

Jagannath et al., "Jam-Guard: Low-Cost, Hand-held Device for First Responders to Detect and Localize Jammers", 14th International Conference on Signal Processing and Communication Systems (ICSPCS), Feb. 2021.

Angskog et al., "Resilience to Intentional Electromagnetic Interference Is Required for Connected Autonomous Vehicles", IEEE Transactions on Electromagnetic Compatibility, vol. 61, No. 5, pp. 1552-1559, Sep. 5, 2018.

* cited by examiner

METHODS AND SYSTEMS FOR DETECTING AND MITIGATING AUTOMOTIVE RADAR INTERFERENCE

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for detecting and mitigating automotive radar interference. Such techniques can enable a vehicle radar system to differentiate desired radar returns from other electromagnetic signals propagating in the vehicle's environment. As one example result, the radar system can continue to quantify the changing environment surrounding the vehicle while the vehicle is in operation using radar measurements. Some applications further involve using wireless communication between vehicles to enable efficient navigation with minimal interference in highly-dense radio frequency (RF) environments.

In one aspect, an example method is provided. The method involves receiving electromagnetic signals propagating in an environment via a radar unit coupled to a vehicle, wherein a field of view of the radar unit limits the electromagnetic signals to a particular angle of arrival and a polarization of one or more reception antennas of the radar unit limits the electromagnetic signals to a particular polarization. The method also involves applying a set of filters to the electromagnetic signals to remove first portions of the electromagnetic signals that are outside an expected time range and an expected frequency range where the expected time range and the expected frequency range depend on radar signal transmission parameters used by the radar unit. The method also involves removing, by a computing device and using a model, second portions of the electromagnetic signals that are indicative of spikes and plateaus associated with signal interference based on applying the set of filters to the electromagnetic signals. The model represents an expected digital representation for the electromagnetic signals. The method also involves generating, by the computing device and using remaining portions of the electromagnetic signals, a representation of the environment that indicates positions of a plurality of surfaces relative to the vehicle.

In another aspect, an example system is provided. The system includes a radar unit coupled to a vehicle and a computing device. The computing device is configured to receive electromagnetic signals propagating in an environment via the radar unit. A field of view of the radar unit limits the electromagnetic signals to a particular angle of arrival and a polarization of one or more reception antennas of the radar unit limits the electromagnetic signals to a particular polarization. The computing device is also configured to apply a set of filters to the electromagnetic signals to remove first portions of the electromagnetic signals that are outside an expected time range and an expected frequency range. The expected time range and the expected frequency range depend on radar signal transmission parameters used by the radar unit. The computing device is further configured to remove, using a model, second portions of the electromagnetic signals that are indicative of spikes and plateaus associated with signal interference based on applying the set of filters to the electromagnetic signals. The model represents an expected digital representation for the electromagnetic signals. The computing device is also configured to generate, using remaining portions of the electromagnetic signals, a representation of the environment that indicates positions of a plurality of surfaces relative to the vehicle.

In yet another example, an example non-transitory computer-readable medium is provided. The non-transitory computer-readable medium is configured to store instructions, that when executed by a computing system comprising one or more processors, causes the computing system to perform operations. The operations involve receiving electromagnetic signals propagating in an environment via a radar unit coupled to a vehicle. A field of view of the radar unit limits the electromagnetic signals to a particular angle of arrival and a polarization of one or more reception antennas of the radar unit limits the electromagnetic signals to a particular polarization. The operations also involve applying a set of filters to the electromagnetic signals to remove first portions of the electromagnetic signals that are outside an expected time range and an expected frequency range. The expected time range and the expected frequency range depend on radar signal transmission parameters used by the radar unit. The operations also involve removing, using a model, second portions of the electromagnetic signals that are indicative of spikes and plateaus associated with signal interference based on applying the set of filters to the electromagnetic signals. The model represents an expected digital representation for the electromagnetic signals. The operations also involve generating, using remaining portions of the electromagnetic signals, a representation of the environment that indicates positions of a plurality of surfaces relative to the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
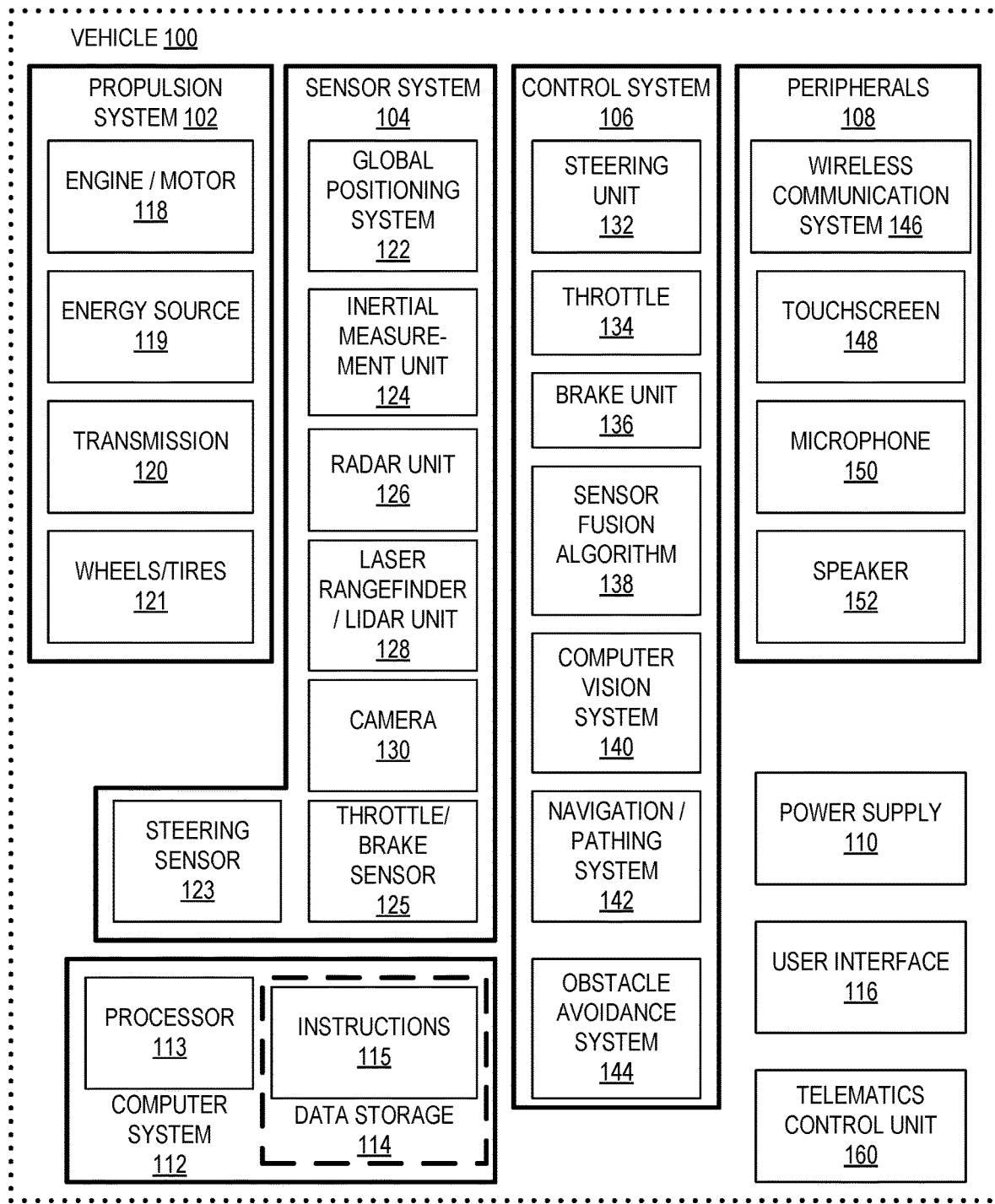
FIG. 1 is a functional block diagram illustrating a vehicle, according to one or more example embodiments.
Figure 2A:
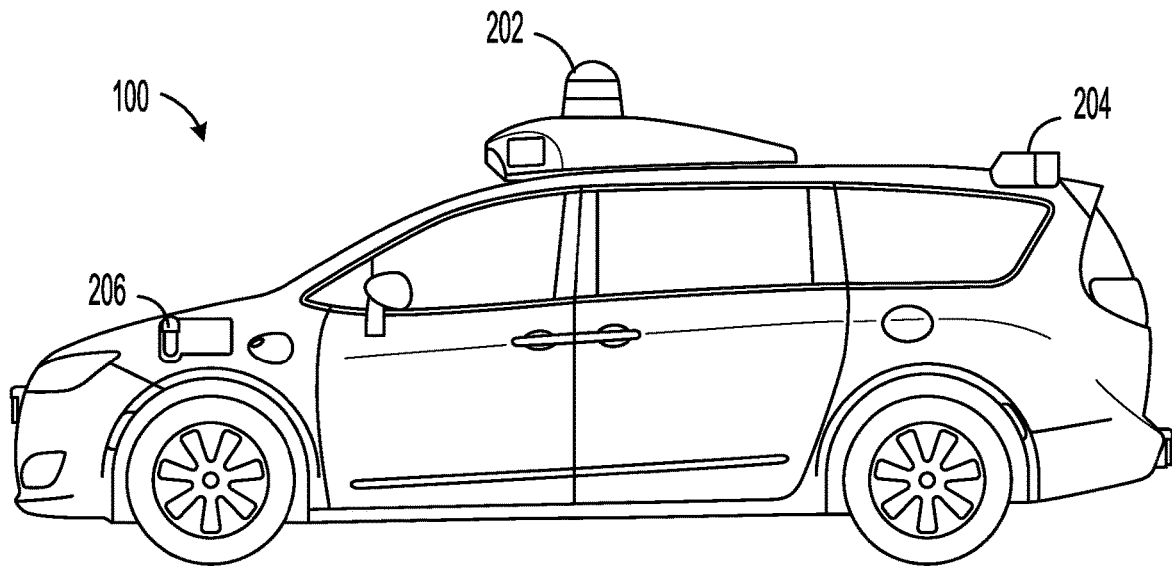
FIG. 2A illustrates a side view of a vehicle, according to one or more example embodiments.
Figure 2B:
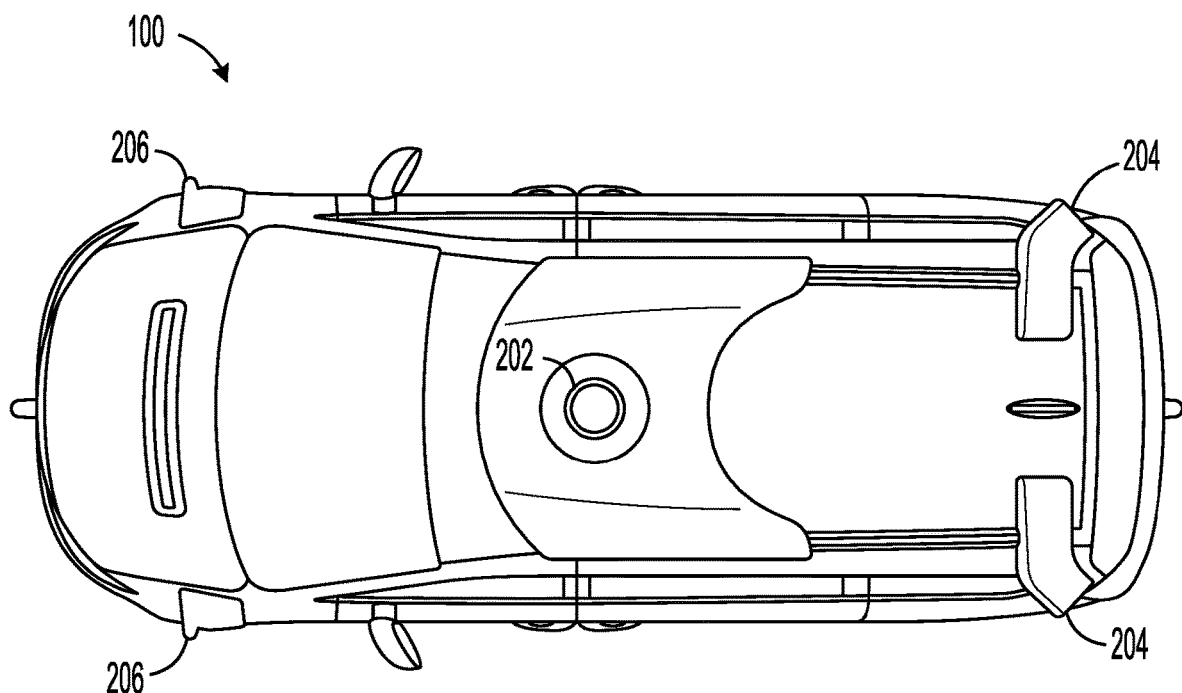
FIG. 2B illustrates a top view of a vehicle, according to one or more example embodiments.
Figure 2C:
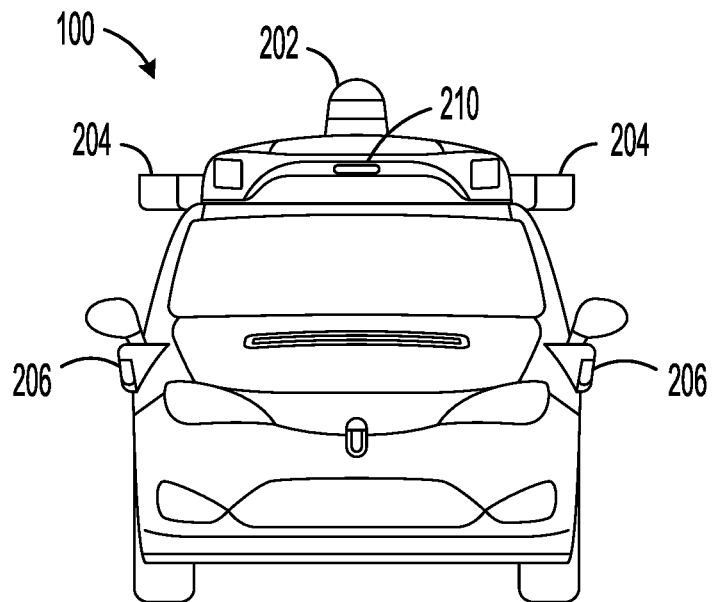
FIG. 2C illustrates a front view of a vehicle, according to one or more example embodiments.
Figure 2D:
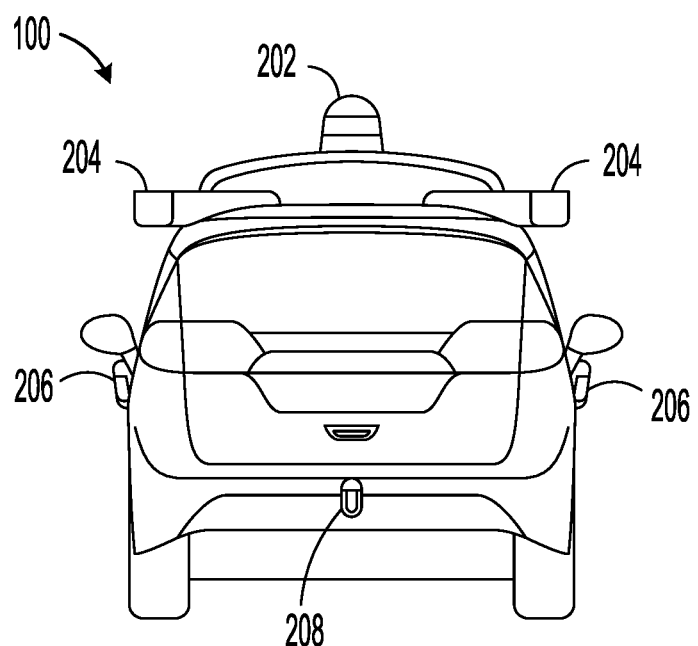
FIG. 2D illustrates a back view of a vehicle, according to one or more example embodiments.
Figure 2E:
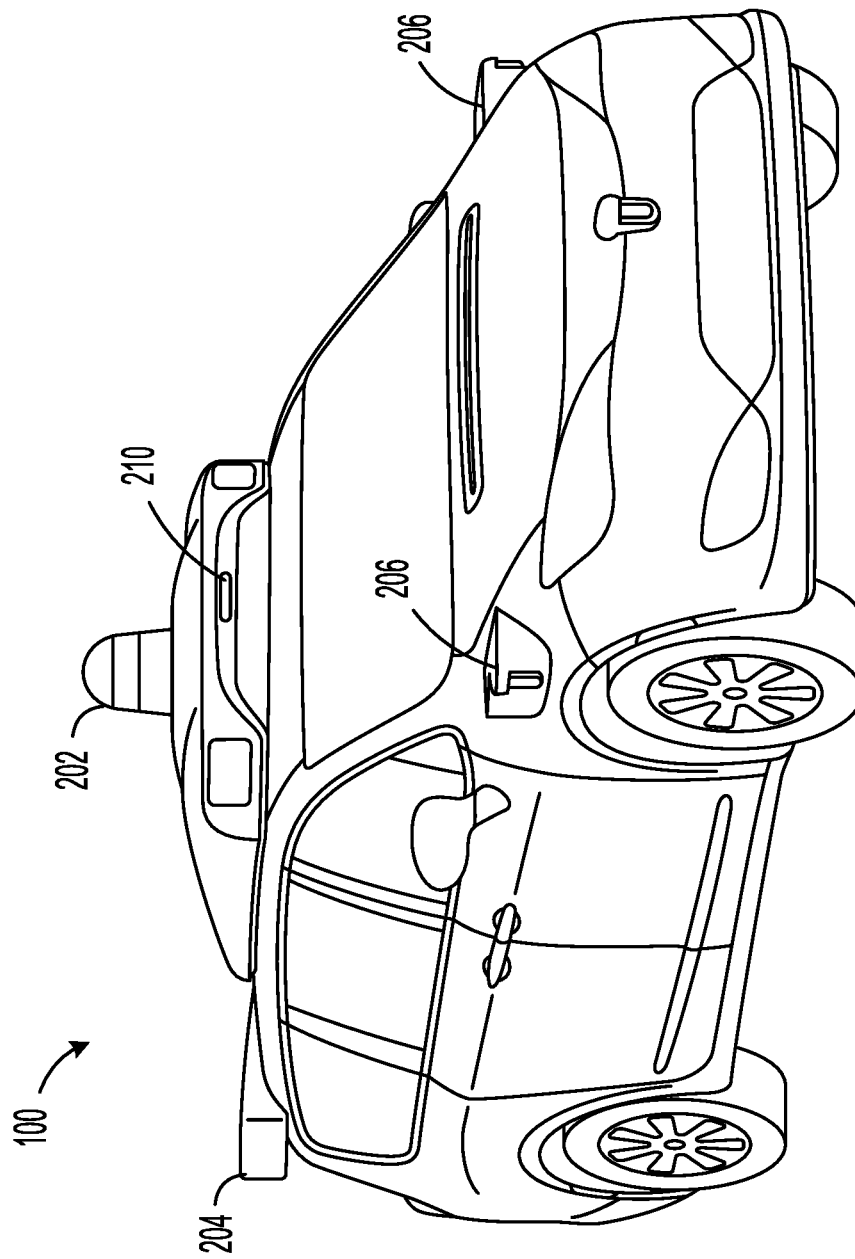
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system is used for detecting objects and estimating their positions by transmitting radio frequency electromagnetic signals (i.e., radar signals) and analyzing the backscattered signals from the objects and other surfaces in the environment. The system can estimate a range for an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit.

A radar processing system (e.g., a computing device) may process radar data to generate two dimensional (2D) and/or three dimensional (3D) measurements that represent aspects of the environment, such as the positions, orientations, and movements of nearby objects and other surfaces occupying the environment near the radar system. Because a radar system can be used to measure distances and motions (including zero motion) of nearby objects and other surfaces, vehicles are increasingly incorporating vehicle radar systems that can obtain and provide useful information for vehicle navigation, obstacle detection and avoidance, and other vehicle operations that can boost overall vehicle safety. For example, some radar systems can be used to detect and identify the positions, orientations, and/or movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals and other road infrastructure. As such, radar offers a way for vehicle systems to continuously assess and understand changes during operation in various environments and can supplement sensor data from other types of sensors.

In some applications, a vehicle radar system can provide information aimed to assist the vehicle's driver. For instance, radar measurements may be used to generate alerts when the vehicle drifts outside its lane, when the vehicle travels too closely to another vehicle or object, and/or in other ways that can help the driver safely control the vehicle. Radar measurements can also be used to help enable autonomous operation of the vehicle. In particular, radar data can be used by control systems to understand and safely navigate the vehicle's environment in real or near real-time as discussed above.

Radio frequency (RF) signals are electromagnetic signals having a frequency from 30 Hz to 300 GHz. Many vehicle radar systems are designed to operate within a radio frequency (RF) automotive band (e.g., within 5 Gigahertz (GHz) of a spectral region that extends between 76 GHz and 81 GHz, inclusive). Although this spectral region can offer plenty of bandwidth to accommodate a single vehicle radar system (e.g., 5 GHz), issues can arise when multiple vehicle radar systems are operating in the same general location. In particular, when multiple radar systems transmit radar signals at similar frequencies within the automotive band (e.g., between 76 GHz and 81 GHz) in the same general environment, interference can arise and impact radar system performance.

Interference can occur when two (or more) radars in relatively close proximity are operating on the same frequency or frequencies (or similar frequencies) causing negative effects that impact radar reflection processing for both radar systems. In practice, a radar system may fail to distinguish between reflections of its own transmitted signals and other signals produced by other emitters in the surrounding environment when the signals share similarities, such as operating at similar frequencies and waveforms. As such, interference can result in noise that disrupts and decreases a vehicle radar system's ability to accurately measure aspects of the surrounding environment.

With the number of vehicles that use radar continuing to increase overall, vehicle radar systems are more likely to encounter interference during navigation within various environments, especially within city limits and other RF-dense areas that typically have more vehicles navigating in multiple directions. Thus, there clearly exists a need to be able to decrease the potential negative impacts of interference that can arise as a vehicle navigates, e.g., through dynamic environments shared with other signal-producing emitters.

Example embodiments presented herein relate to techniques for detecting and mitigating automotive radar interference, which can enhance vehicle radar performance within RF-dense environments occupied by electromagnetic signals transmitted by external emitters, such as other vehicle radar systems and roadway infrastructure. By performing disclosed techniques, a vehicle radar system can distinguish radar returns from the interference produced by other emitters and use the radar returns to measure or map aspects of the environment during vehicle operation.

In addition, unlike many conventional techniques, disclosed operations described herein can be executed during standard vehicle radar system operations. For example, a vehicle can perform the disclosed techniques without switching the vehicle radar system (or parts of the system) to a passive receive-only mode and avoid temporarily suspending transmissions by the radar system. As a result, a vehicle can continue to effectively use radar to understand aspects of the surrounding environment while minimizing negative effects from interference.

A vehicle may encounter potential interference from various types of emitters, including other vehicles, roadside stations, and traffic signals, among others. Reception antennas located on the vehicle may receive various signals (or portions of the signals) as they propagate in the environment. As a result, received signals can include both desired radar returns (reflections of signals transmitted by the vehicle radar system itself) and the electromagnetic energy of unwanted signals that originated from the other sources (e.g., a nearby vehicle). Disclosed techniques can minimize the impact of these unwanted signals when processing the radar returns.

Some example techniques involve using particular aspects of the vehicle radar system to reduce the reception of signals produced by other emitters. For instance, radar antenna topology of radar units positioned on the vehicle can mitigate the reception of signals from some emitters during navigation. The reception antennas for the vehicle radar system can be configured to receive signals having a particular polarization or polarizations (e.g., slanted 45 degrees) that align with the signals transmitted by the vehicle radar system. As a result, antenna topology can help block signals propagating with different polarizations from being received by the vehicle radar system. As an example, when the vehicle radar system is configured to transmit and receive signals having a horizontal polarization, the configuration of the reception antennas can be limited to receive signals that have the horizontal polarization and may block signals with other polarizations (e.g., vertical polarization) from being received by the vehicle radar system.

The orientation and position of reception antennas (and the radar units in general) can also help prevent receiving some signals from other emitters. In practice, the field of view of the reception antennas limits the angle of arrival in which signals can arrive for reception by the reception antennas. As a result, signals propagating toward the vehicle from an angle outside the field of view of the reception antennas may not align with the reception antennas and may not be received.

Despite the different limitations discussed above, the vehicle radar system may still receive some undesired signals in addition to desired radar returns. In particular, these undesired signals may display some dimensions (e.g., polarization and angle-of-arrival) that resemble the dimensions associated with desired radar returns despite originating from an external emitter. For example, an emitter can be positioned relative to a radar unit in a manner that enables signals transmitted by the emitter to be received by the radar unit. In addition, the emitter may be transmitting signals with a particular polarization that aligns with the reception antennas of the vehicle radar system enabling some of the electromagnetic energy from the emitter to be received.

To mitigate the impact of these undesired signals, techniques disclosed herein may further involve using expectations (e.g., expected ranges) for other dimensions of radar returns to differentiate the returns from undesired signals. For instance, in addition to polarization and angle-of-arrival, an example system may also compare other dimensions to expected ranges or parameters when processing received signals to distinguish desired measurements from interference, such as the frequency, timing, waveform (e.g., pulse profile and pulse width), spatial resolution, and timing (e.g., carrier period, pulse repetition frequency), among others.

Applications can involve using all or a subset of these dimensions to distinguish potential interference from the desired reflections of radar signals transmitted by the vehicle radar system. These dimensions can be analyzed in real-time to enable vehicle operations in dynamic environments that can involve one or more other objects in motion as well as static objects, such as other vehicles, pedestrians, and roadside infrastructure, etc.

In some cases, environment and external emitter transmission parameters can impact the quantity of dimensions used by vehicle systems to differentiate between desired radar returns and unwanted signals. For instance, the quantity of emitters producing signals in the environment as well as the similarities between these signals and expected radar returns can impact the differentiation and a subsequent mapping process performed by a vehicle radar system. In some applications, a low number of dimensions can be used to distinguish between radar returns and radar frequency interference (RFI). For instance, the polarization, angle-of-arrival, and frequency may provide sufficient information to enable vehicle processing units to reduce the impact of RFI when measuring or mapping the environment using radar returns. In other cases, however, signals propagating in the environment may closely resemble the dimensions of expected radar returns, which may require more dimensions to be analyzed to distinguish the returns from the RFI. For example, an environment with numerous vehicles (e.g., a city environment) may have many emitters transmitting signals according to a variety of transmission parameters (e.g., frequency, orientation, and waveform) thereby increasing the chances of interference. As a result, vehicle systems may be configured to use more dimensions when distinguishing desired returns from interference in some environments or operating domains than in others. In some embodiments, a vehicle system modifies the configuration automatically as it enters or exits predefined environments or operating domains. The vehicle system may, for example, determine that the vehicle is entering or exiting the environment or operating domain based on location or map data, its own sensor data, or sensor data from other vehicles or roadway infrastructure.

In addition, some RFI may closely resemble properties of desired radar returns and require using techniques to enable differentiation at multiple stages. In practice, RFI mitigation can occur in both the analog context and digital context. As an example, a system may initially apply a set of filters to received signals to remove portions of the electromagnetic signals that are outside an expected time range and expected frequency range. The system may subsequently remove other portions of the electromagnetic signals that are indicative of spikes and plateaus associated with signal interference based on a model that represents an expected digital representation for the electromagnetic signals. The system may use remaining portions of the electromagnetic signals to generate a representation of the environment that indicates positions of surfaces relative to the vehicle.

In some embodiments, the analysis used to distinguish between radar reflections and potential interference can involve comparing one or more signal dimensions of received signals to corresponding expected signal dimensions developed by transmission parameters. For instance, the expected signal dimensions may include an expected polarization (e.g., negative 45 degrees polarization), expected spatial parameters (e.g., spatial resolution), expected timing, an expected frequency (e.g., 80 GHz center frequency), expected waveform diversity and geometry, among other dimensions. These expected signal dimensions can be used to remove portions of signals that do not fall within expectations in both the analog stage and the digital stage of signal processing.

Some dimensions may depend on a combination of factors, such as a combination of software and hardware aspects of the vehicle radar system. For instance, filters can be used to remove portions of electromagnetic signals that fall outside a desired frequency range and a desired timing. These filters can be designed based on the transmission parameters used by the vehicle radar system when transmitting radar signals into the environment. In addition, the tolerance afforded for different dimensions can also vary. Some dimensions (e.g., polarization and frequency) may require incoming signals to be within a smaller threshold relative to the expected polarization than other dimensions. In some embodiments, one or more thresholds can be used to determine whether RF parameters differ from expectations.

In some cases, multiple signal dimensions can be analyzed in parallel. For example, filters can analyze frequency, polarization, and waveform within incoming signals in parallel to differentiate undesired noise and interference from radar returns that can be used to measure or map the environment. Signal dimensions can also be analyzed (e.g., compared to expected ranges) in a linear order in some implementations with the order differing within embodiments. To illustrate, in one example, a system may analyze incoming signals in the following order: spatial parameters, polarization, frequency, timing, and waveform and/or phase alignment with expectations. In another example, the system may analyze incoming signals in another order involving one or more dimensions, such as polarization, spatial parameters, and/or phase alignment. These examples can also involve more or fewer dimensions undergoing analysis in some capacity. In addition, some examples can involve a combination of linear and parallel analysis of dimensions within signals received at the vehicle radar system.

Some embodiments further involve generating a signature for an emitter in the environment based on determining that received electromagnetic signals likely originated from the emitter. A signature for an emitter is used herein to represent information that can be attributed to the emitter. For example, a signature for an emitter may associate dimensions with that emitter. In some cases, the information can include temporary parameters assigned to the emitter, such as a location of the emitter relative to the vehicle. For instance, the external emitter can be another vehicle that may navigate to other positions over time and thus the location of the external emitter can be temporary in nature. The vehicle radar system and/or other sensors (e.g., cameras) can continue to monitor the location of the external emitter as the vehicle navigates.

The information within the signature can include parameters that can help describe signal transmission aspects for the emitter. In some embodiments, the assigned information can help classify the emitter and may indicate the parameters measured within the received electromagnetic signals, a location of the emitter, one or more images of the emitter, and/or other potential information. For example, the vehicle may direct one or more sensors (e.g., camera) toward a detected external emitter to gather further information about the external emitter. In some instances, a camera system on the vehicle may capture one or more images of another vehicle that is transmitting the electromagnetic signals detected by the vehicle radar system and subsequently associate one or more dimensions estimated for the received signals with that make and model of vehicle. Over time, the vehicle may be able to develop signatures that identify different emitters (e.g., manufacturer and models) based on performing iterations of detection and mitigation techniques in different environments.

Some example embodiments further involve a vehicle communicating with other computing devices with respect to disclosed operations. For example, the vehicle may communicate signatures and other information to other vehicles and/or a central system, which may enable other vehicles to access and use the information during operation. For instance, the central system may maintain a data store that includes signatures that specify information for different vehicle types. In some embodiments, information from a fleet of vehicles may be used to develop signatures that identify different emitters. For example, the information from the fleet of vehicles can be combined to develop a database of signatures that can be used to identify radar parameters associated with vehicles based on vehicle make and models.

In some cases, multiple vehicles may communicate with each other to reduce potential interference. For instance, vehicles operating within a fleet may minimize interference using time and frequency coordination. They may communicate with each other to perform coordination operations that can reduce interference. In some embodiments, a central system may provide signals to a fleet of vehicles to coordinate radar operations in a way that minimizes interference.

In some examples, interference detection and mitigation techniques are executed using assistance from one or more external computing devices. For example, each vehicle may communicate with a central system and/or other vehicles to obtain information that can supplement the performance of a radar interference technique locally at the vehicle. In addition, one or more external computing devices may perform processing techniques and communicate with local processing units positioned on the vehicle in some cases.

Furthermore, some examples may involve techniques performed by radar systems that are not coupled to a vehicle. For instance, a structurally-independent radar system may be used in an example by having a location situated near an intersection that enables the radar system and a corresponding processing unit to develop signatures for various vehicle radar systems. The developed signatures and other information can then be provided to vehicle radar systems for subsequent use during navigation. For instance, a vehicle may detect a particular make and model of vehicle using a camera and modify operations of the onboard radar system based on the signature for that make and model of vehicle without having to perform a radar interference reduction technique.

The detailed description herein may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume). Other spectrum regions can be used.

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals. If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference.

Additionally, a single vehicle may operate two radar units having orthogonal polarizations so that each radar unit does not interfere with the other radar unit. In some instances, by combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array. A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
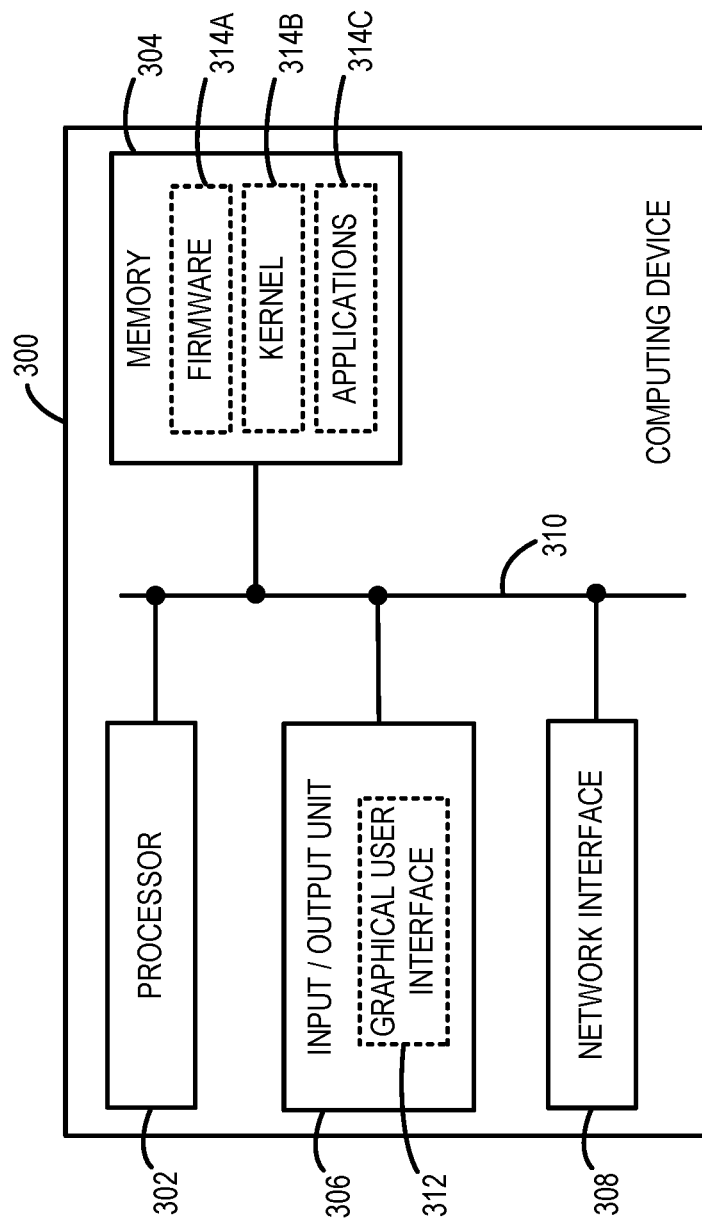
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
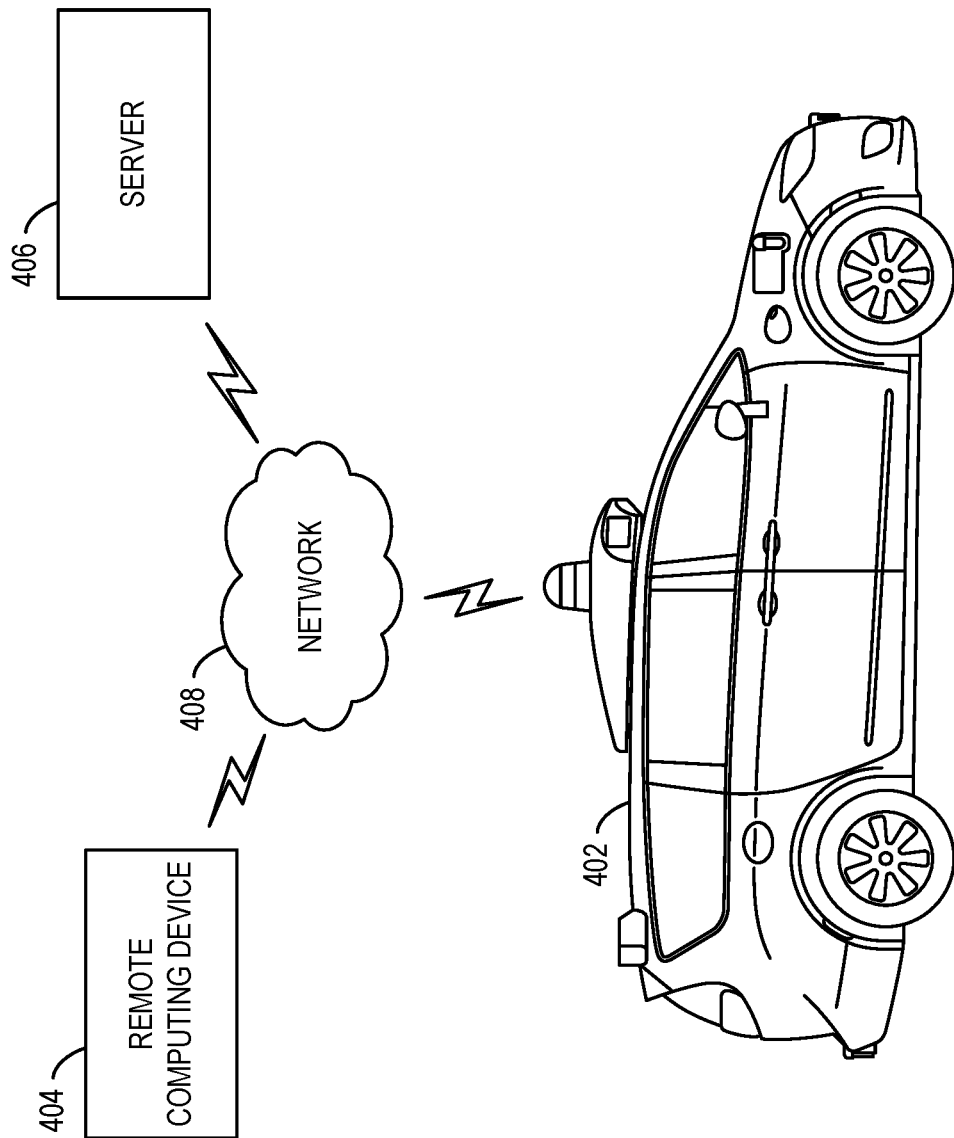
FIG. 4 is a system for wireless communication between a vehicle and computing devices, according to one or more example embodiments

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in autonomous mode, vehicle 402 may navigate to pick up and drop off passengers (or cargo) between desired destinations by relying on sensor measurements to detect and understand the surrounding environment. In some embodiments, vehicle 402 can operate as part of a fleet, which may be managed by a central system (e.g., remote computing device 404 and/or other computing devices).

Remote computing device 404 may represent any type of device or devices configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some embodiments, vehicle 402 may communicate with remote computing device 404 and/or server 406 via network 408 to receive and/or provide information related to automotive interference detection and mitigation techniques described herein. For example, vehicle 402 may communicate signatures determined for different types of vehicles or other emitters in the environment to server 406 for storage and subsequent access by other vehicles. Similarly, vehicle 402 may also access emitter signatures and other stored information from server 406. This way, vehicle 402 may use signatures determined by other vehicles during navigation, which can supplement local performance of radar reduction techniques in some instances.

In addition, remote computing device 404 may be configured to perform processing on sensor data obtained by the vehicle radar system and/or other sensors of vehicle 402. For instance, remote computing device 404 may use deep learning (e.g., an artificial neural network) to detect trends within sensor data captured by vehicle sensors from multiple vehicles navigating different environments. The trends may be used to associate certain bandwidths (e.g., spectral regions) and/or other signal parameters with particular vehicles and/or other types of emitters.

Radio frequency interference (RFI) can represent undesired electromagnetic interference (EMI) that occurs within the RF spectrum from 30 Hz to 300 GHz. For radar architecture implemented for some vehicle radar systems, the operational RF spectrum of interest may lie in the neighborhood of 76 GHz to 81 GHz. In some cases, the RF spectrum of interest can differ. Sources producing RFI are typically located external from the vehicle radar system and can cause undesirable effects, such as radar measurement denial, false target detections, false target tracks, degradation (e.g., increase) of the noise floor, and masking of smaller nearby true targets. In general, multiple sources of RFI may be simultaneously observed with differing geometries and waveforms.

A vehicle radar system can be robust against RFI by incorporating electronic protection (EP) capabilities. Effective EP capabilities can be implemented through the radar system via one or more computing devices and may provide mitigation against RFI by using one or more dimensions, such as polarization, spatial time, frequency, geometry, and waveform diversity to distinguish between the radar measurement objective and the RFI signal.

For RFI to enter the radar via the antenna subsystem, the angular field-of-view (FOV) of the receiving radar overlaps with the interference source. The radar antenna receive gain ($G_R$), a function of the direction of arrival (k) can be viewed as a spatial filter, which can provide some mitigation against RFI. In addition to spatial diversity, the observed polarization of the interference signal from the receiving radar's perspective can also be relatively matched with the polarization of the receiving radar's antenna. The radar antenna polarization can be viewed as a polarization filter that can provide rejection against dissimilar polarized RFI.

The amount of received power from the interference source via the radar antenna subsystem is given by the Friis transmission equation $$P_{RX} = \frac{P_T G_T}{4\pi R^2} \frac{G_R \lambda_C^2}{4\pi} \frac{4}{L_{atmos} L_P L_R} \quad (1)$$

where ($P_T$) represents the interference transmit power, ($G_T$) represents the interference antenna gain in the direction of the victim radar, (R) is the range (e.g., Euclidean distance) from the interference to the radar, ($G_R$) is the receive element gain of the radar in the direction of the interference, ($\lambda_k$) is the wavelength at the center frequency of the waveform, ($L_{atmos}$) is the one-way atmospheric loss, ($L_R$) are the radar RF losses on receive, and ($L_P$) is the polarization loss factor (mismatch).

To illustrate an example, the polarization of the receive antenna for a vehicle may be a slanted polarization (e.g., −45 degrees). In this example, the polarization loss factor convention used can be inversely proportional to the inner-product (dot) of the radar's receive antenna polarization ($p_R$) and the observed interference polarization can be described as follows:

$$p_J; L_p^{-1} = |p_R^H p_J|^2 \quad (2)$$

Perfect polarization orthogonality can yield maximal loss on the interference signal, but this might not be realized in practice. In addition, to complicate polarization aspects further, the observed polarization of the interference source and the polarization loss factor are in general a function of the DOA, but enter the spatial steering vector linearly.

In some examples, for the interference to progress further through the radar RF subsystem, the time and frequency of the interference signal should overlap with the radar's operational time and frequency. Once these conditions are satisfied, the interference signal may then be digitized and captured in the radar phase history data. For example, immediately after the interference signal enters the RF front-end, the RFI signal may pass through a low noise amplifier (LNA) and then mixed with the chirped LO followed by filtering via the intermediate frequency (IF) filter.

In practice, the antenna subsystem, LNA, and the receive mixer can be broadband components and may not be expected to provide frequency rejection within the spectrum used by the vehicle radar system (e.g., 76 GHz to 81 GHz spectrum). As a result, the IF filter may be used to provide frequency mitigation against RFI. After IF filtering, the interference signal can then be digitized and captured in the radar phase history data along with receiver thermal noise and any internal hardware spurious signals.

RFI in the context of radar is generally categorized as coherent and non-coherent interference. The determination of coherent RFI versus non-coherent RFI can depend on the level of similarity with the phase of the radar waveform backscattered from targets and clutter. When the RFI is well matched with the phase of the radar waveform, the resulting interference signal can be described as coherent. Upon processing, the coherent interference signal may be nearly indistinguishable from true target signals (i.e., desired reflections of radar signals).

When the RFI signal is poorly matched to the phase of the radar waveform, the interference can be described as non-coherent. Similar to receiver thermal noise, once the non-coherent interference is processed, the interference signal can be spread across multiple ranges and/or Doppler filters for further separation and differentiation. In practice, RFI can exist anywhere between non-coherent and coherent. Thus, a vehicle radar system can encounter a vast spectrum of RFI when navigating different environments.

Figure 5:
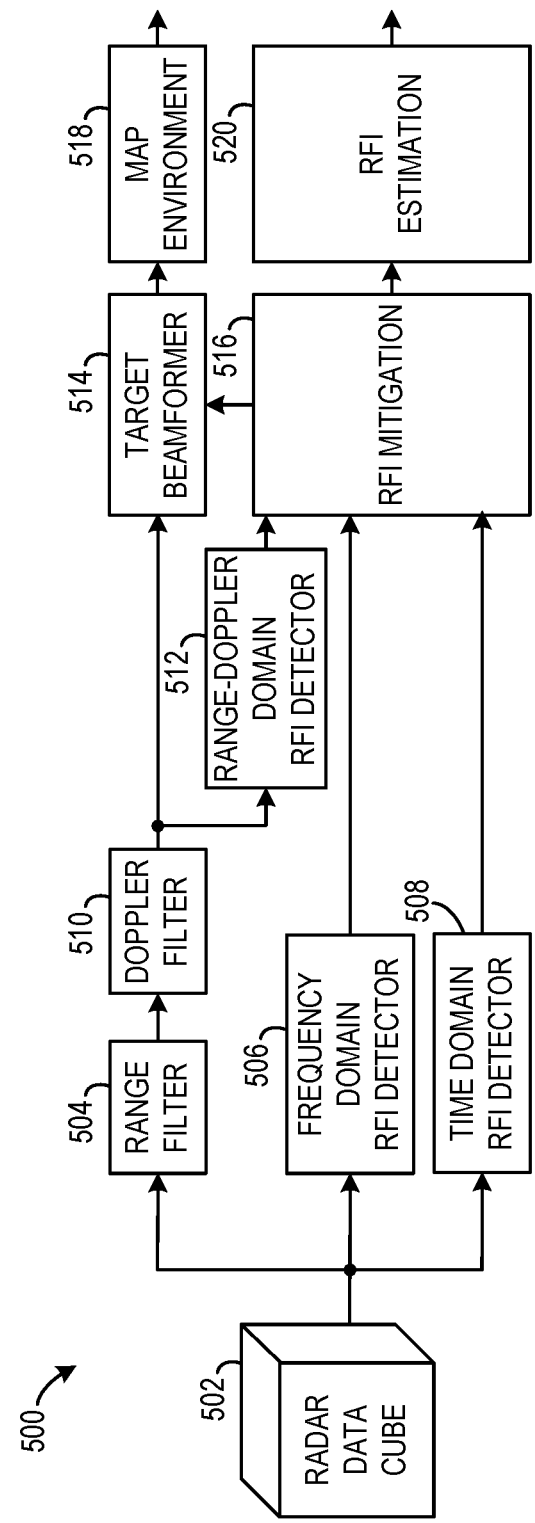
FIG. 5 is a simplified block diagram for a system that can detect and mitigate automotive radar interference, according to one or more example embodiments.

FIG. 5 is a simplified block diagram for system 500 that can detect and mitigate automotive radar interference. In the example embodiment, system 500 includes radar data cube 502, range filter 504, frequency domain RFI detector 506, time domain RFI detector 508, Doppler filter 510, Range-Doppler domain RFI detector 512, target beamformer 514, RFI mitigation 516, map environment 518, and RFI estimation 520. In other embodiments, system 500 may include more or other components in other arrangements. In addition, components can be replaced, combined, and/or further divided in some other implementations.

System 500 may perform RFI detection and mitigation techniques presented herein. For example, system 500 may be implemented as part of a vehicle radar processing system or another computing device that can enable the vehicle to use radar to understand and map portions of the vehicle's surrounding environment.

During navigation, radar reception antennas positioned on a vehicle may receive electromagnetic signals from the environment, which can include signals (or portions of signals) that originated from other emitters. In some cases, these undesired signals can display similar parameters as desired radar reflections, which results in RFI that can impact the accuracy of radar measurements by the vehicle radar system. As such, system 500 may perform techniques described herein to detect and distinguish desired radar returns from RFI and enable vehicle systems to map changes in the environment as the vehicle navigates.

Radar data cube 502 represents electromagnetic signals that can be received by a vehicle radar system during vehicle navigation. In some applications, one or more field programmable gate arrays (FPGAs) associated with the vehicle radar system can output raw signal data in the form of radar data cube 502. As such, the dimensions of radar data cube 502 can represent different information from radar returns and other signals received by reception antennas, such as range data, azimuth data, elevation data, and Doppler data. In particular, each voxel within radar data cube 502 can indicate a radar cross section (RCS) measurement and other information (e.g., Doppler data) for a surface located at a given range, an azimuth, and an elevation relative to the vehicle. In some cases, the different RCS measurements within voxels can be impacted by RFI.

System 500 may be performed according to various configurations of vehicle radar systems, which may use one or more radar units to receive the signals represented by radar data cube 502. Within examples, a radar unit may include one or multiple receive antennas, which can serve as transducers that enable converting propagating fields to voltages and currents on transmission lines. The time-domain signals can represent the voltage function with respect to time and can be manipulated to extract useful information from them. In particular, system 500 may apply desired mathematical functions to the signals of interest to extract information that can be used to map the environment.

Range filter 504 may involve one or more filters configured to enable range estimates to be derived for the targets within the environment. In practice, range filter 504 can be an electronic circuit that selects signals within a given time period, which can differentiate from RFI that fall outside the desired range. One or more range filters 504 can be used for the vehicle radar system to select certain targets for further processing. As such, range filter 504 can be used to remove RFI that differs from desired range, which can help during navigation where emitters can be positioned at various distances relative to the vehicle.

Frequency domain RFI detector 506 may perform processing signal techniques for the frequency domain and can have components similar to time domain RFI detector 508. For example, frequency domain RFI detector 506 can smooth and sharpen received signals by removing high and/or low frequency components of the signals that are outside an expected frequency range. For example, when the vehicle radar system is transmitting signals at a particular frequency (e.g., 80 GHz), frequency domain RFI detector 506 can filter signals having frequencies outside a threshold range based on 80 GHz (e.g., less than 79.5 GHz and greater than 80.5 GHz). In some applications, frequency domain RFI detector 506 may include one or more low pass filters, high pass filters, and band pass filters.

In some examples, frequency domain RFI detector 506 can detect and/or remove portions of radar data cube 502 that are outside an expected frequency range, which can depend on the transmission parameters (e.g., carrier frequency) used by the radar system to transmit radar signals. In some examples, frequency domain RFI detector 506 can perform non-coherent integration of received radar data cube 502 along one or more dimensions and compare these profiles against a threshold or thresholds (e.g., one or more frequency thresholds). The threshold(s) applied to differentiate desired signal data from RFI can vary in some examples and may be adjusted to reduce false positives. As such, frequency domain RFI 506 can be used to detect potential RFI using the frequency domain.

Time domain RFI detector 508 can be used to process the electromagnetic energy in the time domain. For example, time domain RFI detector 508 can receive radar data cube 502 and detect RFI based on outlier time domain energy. In practice, time domain RFI detector 508 can detect and/or remove portions of radar data cube 502 that are outside the expected time range.

In some examples, time domain RFI detector 508 can perform non-coherent integration of the received radar data cube along one or more dimensions and compare these profiles against a threshold or thresholds. The threshold(s) applied to differentiate desired signal data from RFI can vary in some examples and may be adjusted to reduce false positives.

Using Maxwell's equations, the propagating fields can be described by a second-order differential equation, which has its natural solution sinusoids. As such, it can be useful to decompose time-domain signals within received signals processing into sinusoidal constituents and assess signal behavior, and perhaps any modifications to the signals, in terms of those sinusoidal basis functions. Signal processing can be described in terms of manipulating sinusoidal signals and/or sinusoidal signal components. In some instances, both linear and nonlinear manipulations may be used. Time domain RFI detector 508 can be used to detect potential RFI using the time domain.

A pulse integrator can be used to address gains in probability of detection by using multiple transmit pulses. This gain can be achieved by adding radar returns from different successive pulse periods. Depending on the location of a given pulse integrator in the signal processing chain can indicate whether to describe the integrator as a coherent integration or non-coherent integration. With coherent integration, a coherent integrator (signal processor) can be positioned between a matched filter and amplitude detector. The signal processor can sample the return from each transmit pulse at a spacing equal to the range resolution of the radar set and can add the return from N pulses. After accumulating the N pulses, the signal process can perform the amplitude detection and threshold check. In digital signal processors, the integration can be performed by FFTs.

Non-coherent integration may be performed similar to a coherent integrator and can sum the returns from N pulses before performing a threshold check. In some examples, time domain RFI detector 508 can use channel constant false alarm rate (CFAR) detection, which may be an adaptive algorithm used in radar systems to detect returns against a background of noise, clutter, and interference. In a radar receiver, return signals can be received by one or more antennas, amplified, down-converted to an intermediate frequency, and then passed through detector circuitry (e.g., time domain RFI detector 508) that extracts the envelope of the signal (video signal). The video signal may be proportional to the power of the received echo and can comprise the desired echo signal as well as the unwanted signals from internal receiver noise and external clutter and interference. CFAR detection may be used to determine the power threshold above which any return can be considered to probably originate from a target as opposed to one of the spurious sources. If this threshold is too low, then more real targets may be detected, but at the expense of increased numbers of false alarms. Conversely, if the threshold is too high, then fewer targets may be detected, but the number of false alarms would also be low.

Doppler filter 510 may represent one or more Doppler filters that can be used to detect the magnitude of the Doppler frequency within radar data cube 502. In practice, Doppler filter 510 may differentiate between useful signals and interfering signals and the noise floor (Signal-to-interference-plus-noise ratio (SINR)). For instance, Doppler filter 510 can be implemented as hardware by one or more resonance filters or after the digitization of the received electromagnetic signals. In some examples, Doppler filter 510 may have a structure similar to a matched filter. In some examples, Doppler filter 510 may be implemented as a Doppler filter bank. In some examples, system 500 may apply range filter 504 and Doppler filter 510 to isolate and differentiate measurements from desired radar returns from RFI.

Range-Doppler domain RFI detector 512 represents one or more components that can detect RFI in the range-Doppler domain. For example, range-Doppler domain RFI detector 512 may include spatial covariance training, spatial covariance related detection, eigenvalue decomposition, and eigenvalue detection. RFI spatial covariance training may be tailored to specific antenna topologies of one or more radar units used by the vehicle radar system as well as waveforms used by the radar units. In some examples, system 500 may use range-Doppler domain RFI detector 512 to further distinguish desired radar returns from RFI after filtering the signals via range filter 504 and Doppler filter 510. Range-Doppler domain RFI detector 512 may isolate undesired signals for subsequent mitigation at RFI mitigation 516.

Target beamformer 514 may combine multi-channel data using a predetermined set of complex-valued beamforming weights. For RFI spatial mitigation 516, these weights may be updated using a data-adaptive approach via sample matrix inversion of the RFI spatial covariance. RFI mitigation 516 represents a component of system 500 that can enable mitigation of RFI received by the radar system. In some examples, RFI mitigation 516 includes matrix inverse, RFI beamformer, update beamformer weights, edit and repair, and custom filtering. In addition, spatial mitigation may be performed with updated target beamformer 514 weights, which can restore performance in non-RFI directions (e.g., sidelobes).

Map environment 518 may represent one or more components that provide information about one or more targets in the environment. This can involve generating a 2D and/or 3D representation of the environment that includes RCS measurements indicative of one or more targets in the environment.

In some embodiments, map environment 518 may be used to generate 2D and/or 3D digital reconstructions of the environment based on the desired radar returns within radar data cube 502. In some instances, the environment is mapped using reconstruction techniques that help mitigate the impact of interference. For example, mapping areas of the environment that host external emitters can involve using a time domain editing and repair technique that can isolate radar reflection measurements from other signals propagating in the environment. The time domain editing and repair technique can involve identifying and removing undesired spikes and small plateaus within digital data derived from received signals. In addition, mapping some areas of the environment can also involve using spatial mitigation. For instance, a system may use spatial filters with nulls adaptively steered in the directions associated with potential interference.

RFI estimation 520 may be used to output parameters about the received RFI. For example, RFI estimation may involve a direction estimation that indicates the direction-of-arrival of the source of received signals. RFI estimation 520 may also involve parameter estimation related to time that can be assigned to the external emitters. In addition, RFI estimation 520 may also involve parameter estimation related to frequency that can be assigned to the external emitters.

In some examples, system 500 may further output a signature (or multiple signatures) that represent information about one or more external emitters in the environment. The information generated via RFI estimation 520 can be used to assign characteristics to an external emitter. For example, the signature can indicate a direction of the emitter relative to the vehicle, and particular signal characteristics (e.g., time, frequency, etc.).

Figure 6:
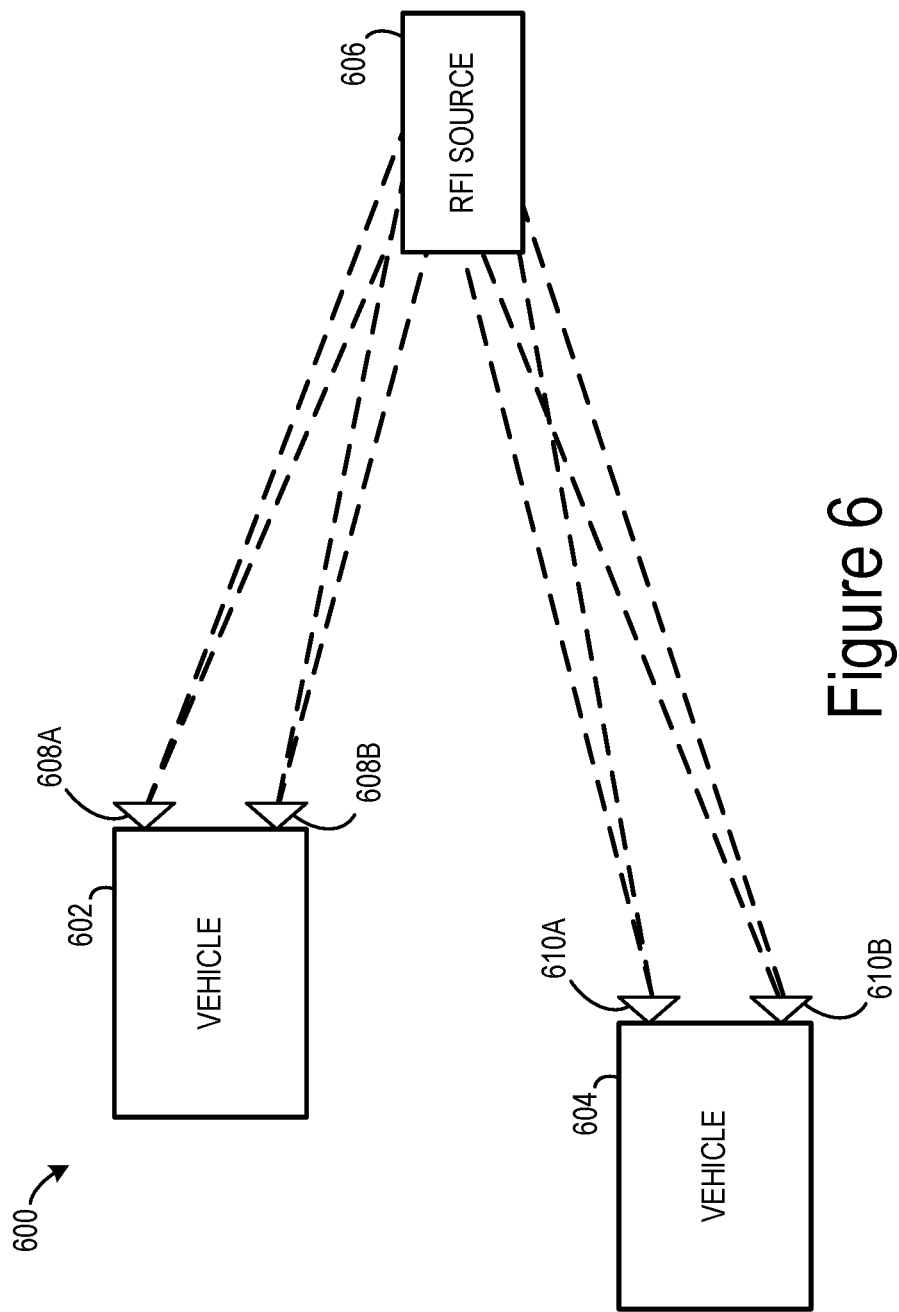
FIG. 6 illustrates multiple vehicles implementing a technique to detect and mitigate radar interference, according to one or more example embodiments.

FIG. 6 illustrates multiple vehicles implementing a technique to detect and mitigate radar interference, according to one or more example embodiments. In the example embodiment, scenario 600 involves vehicle 602, vehicle 604, and RFI source 606. As such, scenario 600 is shown to illustrate an example situation where multiple vehicles may communicate to detect and mitigate potential interference. In other examples, scenario 600 may include other components in other arrangements. For instance, scenario 600 may include more vehicles and/or RFI sources in other examples.

Vehicle 602 and vehicle 604 represent any type of vehicle that may utilize radar to detect aspects of the surrounding environment. As shown in FIG. 6, vehicle 602 includes radar unit 608A and radar unit 608B. Similarly, vehicle 604 includes radar unit 610A and radar unit 610B. Scenario 600 shows a situation where vehicle 602 and vehicle 604 are operating in an environment that also includes RFI source 606. In some instances, RFI source 606 can be any type of RF emitter, such as another vehicle equipped with radar, a road station, or a stand-alone radar emitter.

When RFI source 606 corresponds to an emitter, vehicle 602 and/or vehicle 604 may perform disclosed operations to detect and mitigate potential interference. For instance, vehicle 602 may use measurements from one or both of radar units 608A, 608B to detect and localize RFI source 606 relative to vehicle 602. Similarly, vehicle 604 may use measurements from one or both of radar units 610A, 610B to detect and localize RFI source 606 relative to vehicle 604. As such, each vehicle 602, 604 can use a single radar unit to determine a direction of arrival of signals originating from RFI source 606 and/or both radar units to triangulate a location of RFI source. For instance, vehicle 602 may use both radar unit 608A and radar unit 608B to triangulate the location of RFI source 606 relative to vehicle 602. In some cases, vehicle 602 and/or vehicle 604 may use three or more radar units to determine additional information about RFI source 606.

In some embodiments, two or more radar units can share IQ data (e.g., pulses). This can lead to cross-correlation of one or more pulses that can generate combinations of relative time-difference of arrival hyperbolas or frequency-difference of arrival (FDOA) contours and/or time-difference of arrival (TDOA) contours. For example, vehicle 602 and vehicle 604 may communicate information to assist in localization of RFI source 606. In some examples, vehicles 602, 604 may cooperatively operate to share information and localize RFI source 606 relative to both vehicles 602, 604. In addition, other information can be shared, such as individual vehicle operation parameters, previously generated signatures, and other information that can help navigation.

Figure 7:
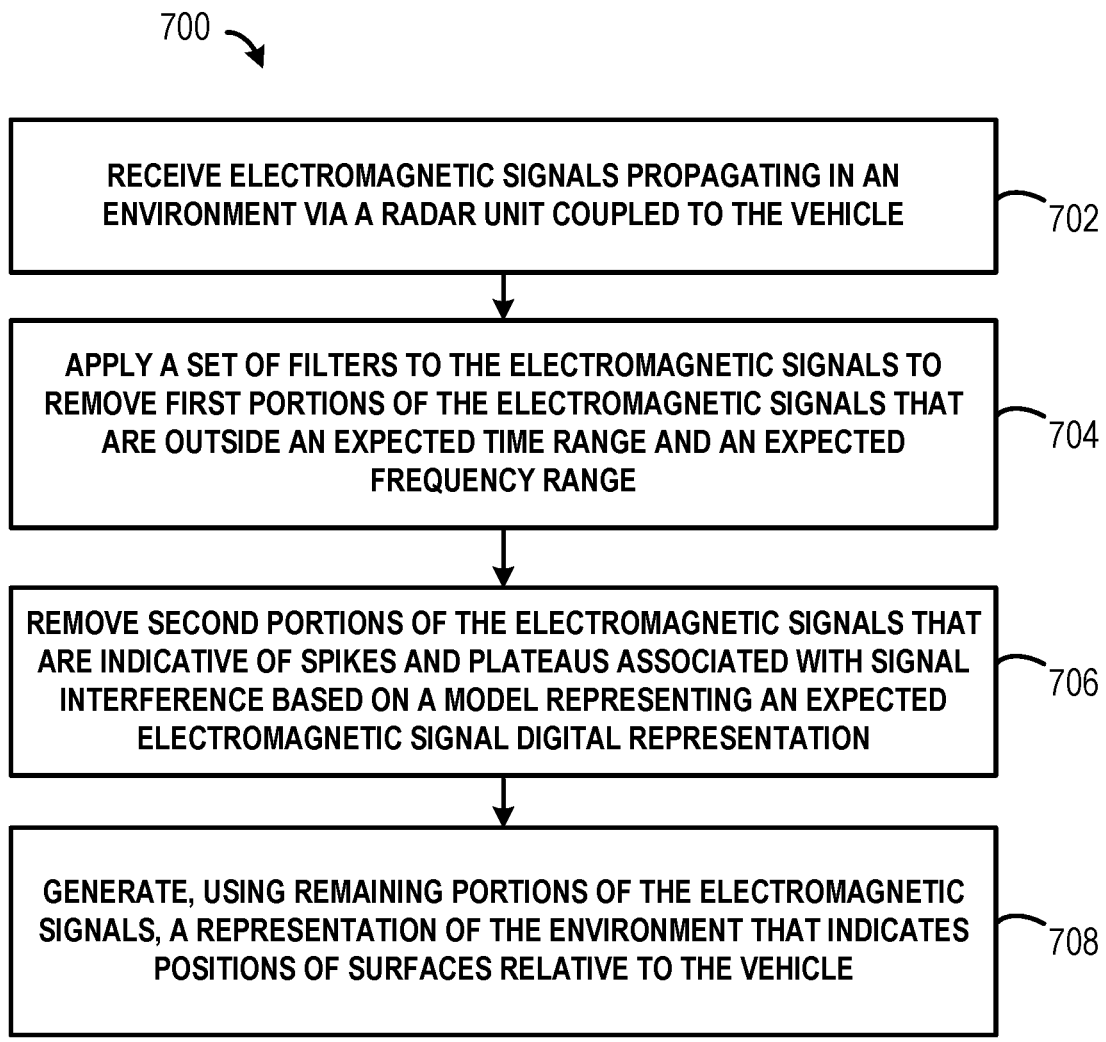
FIG. 7 is a flow chart of a method for detecting and mitigating automotive radar interference, according to example embodiments.

FIG. 7 is a flowchart of example method 700 for detecting and mitigating automotive radar interference, according to one or more embodiments. Method 700 may include one or more operations, functions, or actions, as depicted by one or more of blocks 702, 704, 706, and 708, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves receiving electromagnetic signals propagating in an environment via a radar unit coupled to a vehicle. The field of view for the radar can limit the electromagnetic signals to a particular angle of arrival. In addition, a polarization of one or more reception antennas of the radar unit can limit the electromagnetic signals to a particular polarization. For example, the electromagnetic signals can be received using a reception antenna array that includes a plurality of reception antennas configured to receive electromagnetic signals having a negative 45 degree slant polarization.

At block 704, method 700 involves applying a set of filters to the electromagnetic signals to remove first portions of the electromagnetic signals that are outside an expected time range and an expected frequency range. The expected time range and the expected frequency range can depend on radar signal transmission parameters used by the radar unit.

At block 706, method 700 involves removing second portions of the electromagnetic signals that are indicative of spikes and plateaus associated with signal interference based on a model representing an expected electromagnetic signal digital representation. In some examples, the computing device may remove the second portions of the electromagnetic signals based on applying the set of filters to the electromagnetic signals.

In some examples, removing second portions of the electromagnetic signals involves performing a comparison between a digital representation of the electromagnetic signals and the expected digital representation for the electromagnetic signals and identifying one or more spikes and plateaus associated with signal interference based on the comparison. The computing device may further remove given portions of the electromagnetic signals corresponding to the one or more spikes and plateaus associated with signal interference and repair the digital representation of the electromagnetic signals based on the expected digital representation for the electromagnetic signals. The computing device may then generate the representation of the environment using the repaired digital representation of the electromagnetic signals.

At block 708, method 700 involves generating, using remaining portions of the electromagnetic signals, a representation of the environment that indicates positions of surfaces relative to the vehicle. Vehicle systems may control the vehicle based on the representation of the environment.

Generating the representation of the environment can involve generating a set of representations of the environment using electromagnetic signals received at a plurality of radar units and aligning the set of representations of the environment to produce a total representation that represents the environment extending 360 degrees around the vehicle.

In some examples, method 700 further involves providing the electromagnetic signals to a low noise amplifier (LNA) based on applying the set of filters to the electromagnetic signals and mixing the electromagnetic signals with a local oscillator chirp to produce one or more mixed signals based on providing the electromagnetic signals to the LNA. Method 700 may also involve, based on mixing the electromagnetic signals with a local oscillator chirp, applying an intermediate frequency (IF) filter to the one or more mixed signals to remove one or more portions of the one or more mixed signals. As such, generating the representation of the environment may involve using one or more remaining portions of the one or more mixed signals.

In some examples, method 700 further involves determining, using the electromagnetic signals, one or more electromagnetic signals that originated from an external emitter and estimating a direction of arrival for the one or more electromagnetic signals. Method 700 also involves estimating a location for the external emitter relative to the vehicle using a FDOA process and/or TDOA process. The computing device may further generate a signature for the external emitter that indicates the location for the external emitter, one or more images of the external emitter, and one or more parameters for the one or more electromagnetic signals that originated from the external emitter. For example, the computing device may further estimate a time period and a frequency bandwidth for the one or more electromagnetic signals and assign the time period and the frequency bandwidth to the signature for the external emitter.

In some examples, the computing device may provide a signature for the external emitter to one or more external computing devices. For example, the computing device may provide the signature for the external emitter to one or more vehicles located within a threshold distance from the vehicle.

In some examples, method 700 further involves detecting a first remaining portion of the electromagnetic signals that aligns in phase with a waveform of radar signals transmitted by the radar unit. As such, generating the representation of the environment may then involve generating at least a first portion of the representation of the environment using the first remaining portion of the electromagnetic signals that align in phase with the waveform of radar signals transmitted by the radar unit.

Method 700 may also involve detecting a second remaining portion of the electromagnetic signals that differ in phase form the waveform of radar signals transmitted by the radar unit and applying one or more filters to the second remaining portion of the electromagnetic signals to isolate and differentiate measurements from the second remaining portion of the electromagnetic signals relative to measurements from the first remaining portion of the electromagnetic signals. For instance, this can involve applying a plurality of range and Doppler filters to the second remaining portion of the electromagnetic signals. As such, generating the representation may further involve generating at least a second portion of the representation of the environment using the second remaining portion of the electromagnetic signals relative to measurements from the first remaining portion of the electromagnetic signals.

Some examples may involve receiving the electromagnetic signals and subsequent electromagnetic signals from the environment and subsequently determining that a direction of arrival for the subsequent electromagnetic signals aligns with the direction of arrival for the electromagnetic signals and third parameters for the subsequent electromagnetic signals match the first parameters. The computing device may then generate a two-dimensional map of the environment using the subsequent electromagnetic signals, which can involve generating a first portion of the two-dimensional map that corresponds to the location of the emitter using a time domain editing and repair technique. In particular, the time domain editing and repair technique may isolate measurements of the subsequent electromagnetic energy from the electromagnetic signals and also generate a second portion of the two-dimensional map using spatial mitigation, wherein the second portion of the two-dimensional map represents one or more areas of the environment positioned outside the location of the emitter.

Figure 8:
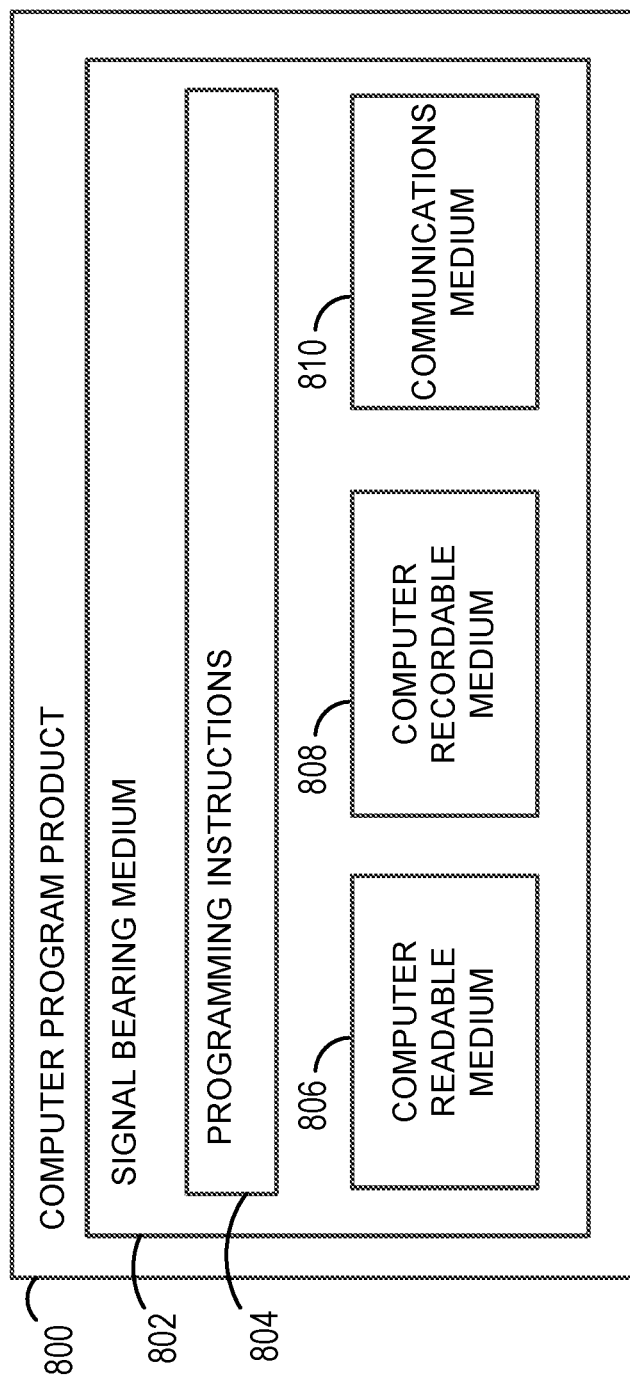
FIG. 8 is a schematic diagram of a computer program, according to example implementations.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-8. In some examples, signal bearing medium 802 may encompass a non-transitory computer-readable medium 806, such as, but not limited to, a hard disk drive, a Compact Disc (CD), a Digital Video Disk (DVD), a digital tape, memory, etc.

In some implementations, signal bearing medium 802 may encompass computer recordable medium 808, such as, but not limited to, memory, read/write (R/W) CDs, R/W DVDs, etc. In some implementations, signal bearing medium 802 may encompass communications medium 810, such as, but not limited to, a digital and/or an analog communication medium (e.g., a fiber optic cable, a waveguide, a wired communications link, a wireless communication link, etc.). Thus, for example, signal bearing medium 802 may be conveyed by a wireless form of communications medium 810.

One or more programming instructions 804 may be, for example, computer executable and/or logic implemented instructions. In some examples, a computing device such as computer system 112 of FIG. 1 may be configured to provide various operations, functions, or actions in response to programming instructions 804 conveyed to computer system 112 by one or more of computer-readable medium 806, computer recordable medium 808, and/or communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
receiving electromagnetic signals propagating in an environment via a radar unit coupled to a vehicle, wherein a field of view of the radar unit limits the electromagnetic signals received to a particular angle of arrival and a polarization of one or more reception antennas of the radar unit limits the electromagnetic signals received to a particular polarization;
applying a set of filters to the electromagnetic signals to remove first portions of the electromagnetic signals that are outside an expected time range and an expected frequency range, wherein the expected time range and the expected frequency range depend on radar signal transmission parameters used by the radar unit; and
removing, by a computing device, second portions of the electromagnetic signals that are indicative of spikes and plateaus associated with signal interference based on a model representing an expected electromagnetic signal digital representation;
detecting a first remaining portion of the electromagnetic signals that align in phase with a waveform of radar signals transmitted by the radar unit and a second remaining portion of the electromagnetic signals that differ in phase from the waveform of the radar signals;
applying one or more filters to the second remaining portion of the electromagnetic signals to isolate and differentiate measurements from the second remaining portion of the electromagnetic signals relative to measurements from the first remaining portion of the electromagnetic signals; and
generating, by the computing device and using the first and the second remaining portions of the electromagnetic signals, a representation of the environment that indicates positions of a plurality of surfaces relative to the vehicle.

2. The method of claim 1,
wherein generating the representation of the environment comprises:
generating at least a first portion of the representation of the environment using the first remaining portion of the electromagnetic signals that align in phase with the waveform of radar signals transmitted by the radar unit.

3. The method of claim 2,
wherein generating the representation of the environment further comprises:
generating at least a second portion of the representation of the environment using the second portion of the electromagnetic signals based on isolating and differentiating measurements from the second portion of the electromagnetic signals relative to measurements from the first portion of the electromagnetic signals.

4. The method of claim 1, wherein applying the one or more filters to the second remaining portion of the electromagnetic signals comprises:
applying one or more range and Doppler filters to the second remaining portion of the electromagnetic signals.

5. The method of claim 1, wherein generating the representation of the environment comprises:
generating a set of representations of the environment using electromagnetic signals received at a plurality of radar units; and aligning the set of representations of the environment to produce a total representation that represents the environment extending 360 degrees around the vehicle.

6. The method of claim 1, wherein receiving electromagnetic signals propagating in the environment of the vehicle via the radar unit coupled to the vehicle comprises:
receiving the electromagnetic signals using a reception antenna array configured to receive electromagnetic signals propagating in a particular polarization.

7. The method of claim 1, wherein removing second portions of the electromagnetic signals comprises:
performing a comparison between a digital representation of the electromagnetic signals and the expected electromagnetic signal digital representation;
identifying one or more spikes and plateaus associated with signal interference based on the comparison; and
removing given portions of the electromagnetic signals corresponding to the one or more spikes and plateaus associated with signal interference; and
repairing the digital representation of the electromagnetic signals based on the expected electromagnetic signal digital representation.

8. The method of claim 7, wherein generating the representation of the environment comprises:
generating the representation of the environment using the repaired digital representation of the electromagnetic signals.

9. The method of claim 1, further comprising:
determining, using the electromagnetic signals, one or more electromagnetic signals that originated from an external emitter;
estimating a direction of arrival for the one or more electromagnetic signals; and
based on the direction of arrival, estimating a location for the external emitter relative to the vehicle using a frequency-difference of arrival (FDOA) process or a time-difference of arrival (TDOA).

10. The method of claim 9, further comprising:
generating a signature for the external emitter, wherein the signature indicates the location for the external emitter and one or more parameters for the one or more electromagnetic signals that originated from the external emitter.

11. The method of claim 10, further comprising:
estimating a time period and a frequency bandwidth for the one or more electromagnetic signals; and
assigning the time period and the frequency bandwidth to the signature for the external emitter.

12. The method of claim 11, further comprising:
providing the signature for the external emitter to one or more external computing devices.

13. The method of claim 12, wherein providing the signature for the external emitter to one or more external computing devices comprises:
providing the signature for the external emitter to one or more vehicles located within a threshold distance from the vehicle.

14. The method of claim 1, further comprising:
controlling the vehicle based on the representation of the environment.

15. A system comprising:
a radar unit coupled to a vehicle; and
a computing device configured to:
receive electromagnetic signals propagating in an environment via the radar unit, wherein a field of view of the radar unit limits the electromagnetic signals received to a particular angle of arrival and a polarization of one or more reception antennas of the radar unit limits the electromagnetic signals received to a particular polarization;
apply a set of filters to the electromagnetic signals to remove first portions of the electromagnetic signals that are outside an expected time range and an expected frequency range, wherein the expected time range and the expected frequency range depend on radar signal transmission parameters used by the radar unit; and
remove second portions of the electromagnetic signals that are indicative of spikes and plateaus associated with signal interference based on a model representing an expected electromagnetic signal digital representation;
detect a first remaining portion of the electromagnetic signals that align in phase with a waveform of radar signals transmitted by the radar unit and a second remaining portion of the electromagnetic signals that differ in phase with the waveform of the radar signals;
apply a plurality of filters to the second remaining portion of the electromagnetic signals to isolate and differentiate measurements from the second remaining portion of the electromagnetic signals relative to measurements from the first remaining portion of the electromagnetic signals; and
generate, using the first and the second remaining portions of the electromagnetic signals, a representation of the environment that indicates positions of a plurality of surfaces relative to the vehicle.

16. The system of claim 15, wherein the computing device is further configured to:
control the vehicle based on the representation of the environment.

17. The system of claim 15, wherein the computing device is further configured to:
cause the radar unit to transmit radar signals into the environment according to a set of parameters, wherein the set of parameters include a time range from the expected time range and a particular frequency from the expected frequency range; and
receive the electromagnetic signals in response to causing the radar unit to transmit radar signals into the environment according to the set of parameters.

18. The system of claim 15, wherein the computing device is further configured to:
generate at least a first portion of the representation of the environment using the first remaining portion of the electromagnetic signals that align in phase with the waveform of radar signals transmitted by the radar unit.

19. The system of claim 18, wherein the computing device is further configured to:
generate at least a second portion of the representation of the environment using the second remaining portion of the electromagnetic signals based on isolating and differentiating measurements from the second remaining portion of the electromagnetic signals relative to measurements from the first remaining portion of the electromagnetic signals.

20. A non-transitory computer-readable medium configured to store instructions, that when executed by a computing system comprising one or more processors, causes the computing system to perform operations comprising:
receiving electromagnetic signals propagating in an environment via a radar unit coupled to a vehicle, wherein a field of view of the radar unit limits the electromagnetic signals received to a particular angle of arrival and a polarization of one or more reception antennas of the radar unit limits the electromagnetic signals received to a particular polarization;

applying a set of filters to the electromagnetic signals to remove first portions of the electromagnetic signals that are outside an expected time range and an expected frequency range, wherein the expected time range and the expected frequency range depend on radar signal transmission parameters used by the radar unit; and removing, using a model, second portions of the electromagnetic signals that are indicative of spikes and plateaus associated with signal interference based on a model representing an expected electromagnetic signal digital representation;

detecting a first remaining portion of the electromagnetic signals that align in phase with a waveform of radar signals transmitted by the radar unit and a second remaining portion of the electromagnetic signals that differ in phase from the waveform of the radar signals;

applying one or more filters to the second remaining portion of the electromagnetic signals to isolate and differentiate measurements from the second remaining portion of the electromagnetic signals relative to measurements from the first remaining portion of the electromagnetic signals; and generating, using the first and the second remaining portions of the electromagnetic signals, a representation of the environment that indicates positions of a plurality of surfaces relative to the vehicle.

* * * * *